Figure 1:
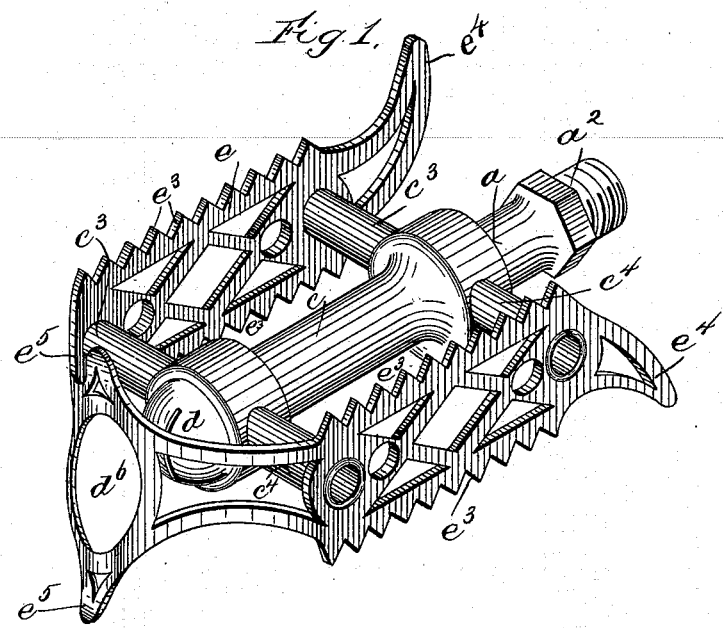

No. 615,505. Patented Dec. 6, 1898.
A. SIDWELL.
BICYCLE PEDAL.
(Application filed Aug. 10, 1895.)

(No Model.)

Witnesses
Jas. J. Maloney.

Inventor.
Arthur Sidwell,
by Jos. P. Livermore
Att'y.

UNITED STATES PATENT OFFICE.

ARTHUR SIDWELL, OF WALTHAM, MASSACHUSETTS, ASSIGNOR TO WALTER MEASURE, OF NEEDHAM, MASSACHUSETTS.

BICYCLE-PEDAL.

SPECIFICATION forming part of Letters Patent No. 615,505, dated December 6, 1898.

Application filed August 10, 1895. Serial No. 558,865. (No model.)

*To all whom it may concern:*

Be it known that I, ARTHUR SIDWELL, of Waltham, county of Middlesex, State of Massachusetts, have invented an Improvement in Bicycle-Pedals, of which the following description, in connection with the accompanying drawings, is a specification, like letters and figures on the drawings representing like parts.

This invention relates to bicycle-pedals of that class in which the pedal is supported on a bearing on a fixed spindle made fast to the crank and has foot-rests or tread portions at each side of and parallel with the spindle, affording two opposite tread-surfaces for engagement with the rider's foot.

As heretofore commonly constructed the pedal runs on ball-bearings near the inner or crank end and the outer end of the spindle, and the tread-bars constitute a portion of the framework that connects and supports the bearing portions of the pedal, so that a distortion of the outer or foot-sustaining portion of the pedal is likely to throw the bearings out of line and to thus interfere with the running of the pedal.

Pedals have also been made in which the bearing portions are formed in the ends of a hub provided near its ends with cross-arms to which the tread portions are attached, so that the tread portions do not constitute an essential part of the frame by which the bearings are connected, and consequently a distortion of the tread-pieces does not throw the bearings out of alinement or interfere with the running of the pedal.

The present invention is intended as an improvement on the type of pedals last described, which as heretofore commonly made have had two independent tread-plates, one attached to each pair of cross-arms extending from the two sides of the hub portion and each having upper and under serrated edges or other suitable surface to afford a firm hold to the foot resting on them. Each tread-plate, furthermore, has commonly had two laterally-projecting horns at the ends of one of the serrated surfaces, said horns being so arranged as to come at the two sides of the foot on the forward bearing-plate, whichever side of the pedal happens to be presented to the foot of the rider. With this construction the prongs or projections which position and confine the foot laterally on the pedal are unsupported and comparatively weak and are therefore likely to become bent or broken by the pedal striking against any obstruction, the horn at the outer end of the pedal being especially exposed to accidental injury.

The pedal forming the subject of the present invention comprises a spindle provided with the usual cones for the balls of the ball-bearings, a hub provided at its ends with corresponding bearing-recesses and with cross-arms extending laterally therefrom, and a tread-piece or foot portion comprising parallel tread-bars connected with the cross-arms and connected together at their outer ends by an arch or bridge portion which extends around and over the end of the spindle and bearing-hub, the said tread portion thus affording front and rear tread-surfaces, the outer ends of which are strengthened and supported by the connecting portion of the tread-piece, which is provided at the middle with horns at the upper and under sides to engage with the outer edge of the foot of the rider, while the inner ends of the tread portion adjacent to the crank are provided with horns extending from opposite sides, so that whichever bar happens to be forward will afford a horn or engaging projection at the inner end of the pedal.

The terms "outer" and "inner" and "upper" and "under" are used as of the pedal standing in normal position with the upper tread-surface at the front and rear of the spindle, thus affording a substantially horizontal bearing for the foot, and the end next the crank being called the "inner" end and the end remote from the crank the "outer" end.

Figure 2:
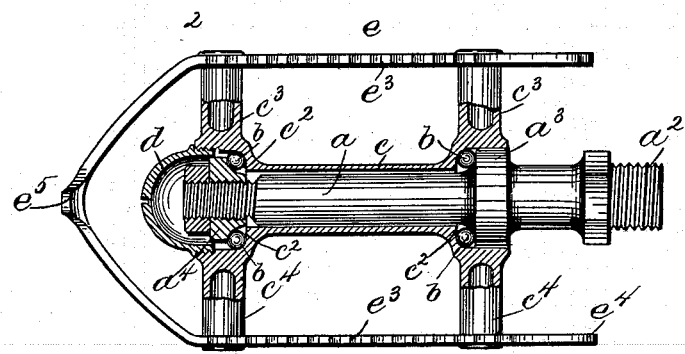
Figure 3:
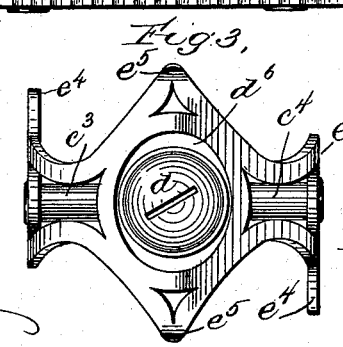

Figure 1 is a perspective view of a pedal embodying this invention; Fig. 2, a longitudinal horizontal section, and Fig. 3 an end elevation as seen looking toward the outer end of the pedal.

The spindle $a$ (see Fig. 2) may be of usual construction, having a screw-threaded shank $a^2$ or other means for securely fastening it to the crank, and a fixed cone $a^3$ near the inner or crank end to coöperate with the balls $b$ of the ball-bearing, and an adjustable cone $a^4$ at the outer end to coöperate with the balls of the other bearing, said series of balls at the inner and outer ends coöperating with suitable bearing-recesses $c^2$ at the ends of the tubular hub portion $c$ of the pedal, which is provided near its ends with cross-arms $c^3$ $c^4$ at opposite sides thereof. The outer bearing-cone is covered and inclosed by a dust-cap $d$, which screws into the end of the hub, the bearing for which is thus complete without the tread portions and is not liable to injury by any distortion of the tread portion, as is the case where the latter serves as a substantial part of the connection between the inner and outer bearing-sockets $c^2$.

The tread portion $e$ of the pedal is composed of a single integral piece bent to a substantial U shape and having its parallel branches connected one with the cross-arms $c^3$ and the other with the cross-arms $c^4$, as shown, the outer ends of said branches being connected by the crown or arch portion, which extends around the outer bearing at the end of the spindle and hub, as best shown in Fig. 2, being preferably approximately angular or V-shaped, as shown. The opposite edges of the tread portions are provided with the usual serrations $e^3$, Fig. 1, or other suitable surface to secure a good foothold and the inner end of the forward tread-bar is provided with an upwardly-turned horn or projection $e^4$, while the inner end of the rear bar is provided with a downwardly-turned projection or horn $e^4$, which would be above and at the front if the pedal were inverted, there thus being always an upward projection at the inner end of the front tread-bar when in use. The middle portion of the arch or outer connecting part of the tread-piece is provided at both upper and under edges with horns or projections $e^5$ to engage with the outer edge of the rider's foot, which is thus laterally positioned and confined by the horn $e^5$ at the outer end of the pedal and the horn $e^4$ at the inner end of the pedal.

By the herein-described construction the pedal is rendered far stronger and more durable without substantial increase in weight, as the central horns $e^5$, having a wider base, are stronger than those at the end of a tread-plate and, furthermore, are in a more protected position, as accidental blows, to which the pedals are subjected, are more likely to come at the points 2 3, Fig. 2, which in this construction are at a salient angle in the continuous tread-plate, which is thoroughly supported and so strong as not to be distorted by any blow short of one which would be likely to destroy the whole pedal. The outer or arch portion of the tread, furthermore, affords an efficient guard and protection for the outer bearing and dust-cap $d$, inclosing the same, and by connecting the ends of the tread-bars causes each to strengthen or reinforce the other and prevents possibility of either bar being torn off from its connection with the cross-arms $c^3$ $c^4$ by an accidental blow.

The effective size or width of the pedal depends upon the width between the inner and outer horns and may be varied by making the arch portion of greater or less length, so that it will extend a greater or less amount beyond the end of the pedal-spindle. Thus pedals of various size or width may be produced readily by making the tread-plates of different length and properly bending the same at the outer end, while the spindle and bearing portion which require accurate fitting may be of uniform construction for all sizes.

The tread-piece is preferably composed of sheet metal and may have portions of its blank surface cut away to reduce the weight and afford an ornamental design. The end portion is provided with a central opening $d^6$ to afford access to the dust-cap and outer bearing on the pedal-spindle when the dust-cap is removed.

I claim—

1. A pedal for velocipedes, having a bearing-piece provided with lateral arms, and a foot-rest having two end portions secured to the said lateral arms and a central portion bowed about the outer end of the bearing-piece and forming a guard therefor, said foot-rest being made of one piece of metal, substantially as described.

2. A bicycle-pedal, comprising a supporting-spindle adapted to be connected with the crank, a bearing-hub supported on said spindle and provided with cross-arms at its inner and outer ends, and the tread-piece consisting of side bars and a crown or arch, all independent of the supporting-bearings, the said side bars of the tread-piece being connected with the ends of the hub-arms one at each side of the hub and the crown or arch extending around the outer end of the hub and spindle in continuation of said side bars, substantially as described.

In testimony whereof I have signed my name to this specification in the presence of two subscribing witnesses.

ARTHUR SIDWELL.

Witnesses:
H. J. LIVERMORE,
M. E. HILL.